(12) United States Patent
Frias et al.

(10) Patent No.: US 6,561,753 B2
(45) Date of Patent: May 13, 2003

(54) OBJECT ENGAGING TOOL AND METHOD OF MANIPULATING OBJECT USING SAME

(75) Inventors: James A. Frias, Oakdale, CA (US); Scott Unruh, Modesto, CA (US)

(73) Assignee: H&F Enterprises, Escalon, CA (US)

( * ) Notice: Subject to any disclaimer, the term of this patent is extended or adjusted under 35 U.S.C. 154(b) by 104 days.

(21) Appl. No.: 09/826,961

(22) Filed: Apr. 6, 2001

(65) Prior Publication Data

US 2002/0015634 A1 Feb. 7, 2002

Related U.S. Application Data

(60) Provisional application No. 60/195,293, filed on Apr. 7, 2000.

(51) Int. Cl.⁷ .............................................. B25J 15/00
(52) U.S. Cl. ........................... 414/816; 294/92; 414/731
(58) Field of Search ........................... 294/92; 414/731, 414/783, 815, 816

(56) References Cited

U.S. PATENT DOCUMENTS

| | | | |
|---|---|---|---|
| 1,352,173 A | * 9/1920 | Campbell | 294/92 X |
| 4,040,601 A | * 8/1977 | Boardman | 294/92 X |
| 5,288,200 A | * 2/1994 | Burgers et al. | 414/758 |
| 5,957,513 A | * 9/1999 | Merritt | 294/92 X |

* cited by examiner

Primary Examiner—Janice L. Krizek
(74) Attorney, Agent, or Firm—Birch, Stewart, Kolasch & Birch, LLP

(57) ABSTRACT

An object engaging tool and method for using same for manipulating bottle shaped objects with a mechanical arm are described. A first and second contact surface of the object engaging tool engage the body of an object when positioned over the object while the object is resting upright. The position of the object engaging tool is changed generally downwardly so the weight of the object is transferred to the object engaging tool and is supported in cantilevered relation thereupon. The object is moved into position and placed on a resting surface whereupon the object engaging tool is disengaged when the weight of the object is transferred to the resting surface. The object engaging tool may further be positioned over the object when resting in a horizontal position and the object engaged and weight transferred to the object engaging tool by changing the position of the object engaging tool upwardly. Multiple object engaging tools may be coupled to a mechanical arm and multiple objects engaged and moved in a like manner.

9 Claims, 6 Drawing Sheets

FIG. 12
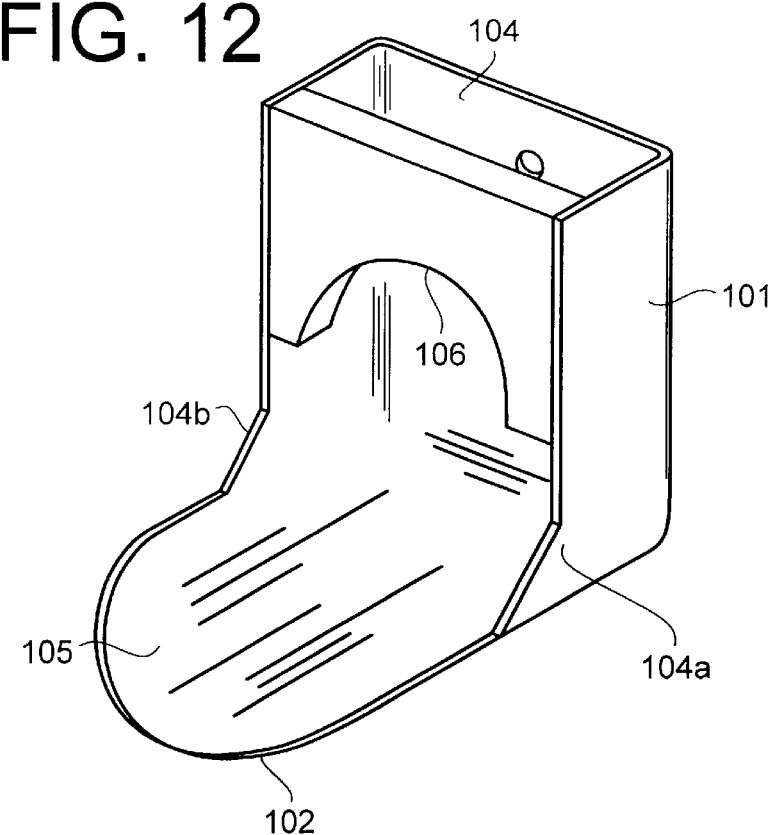
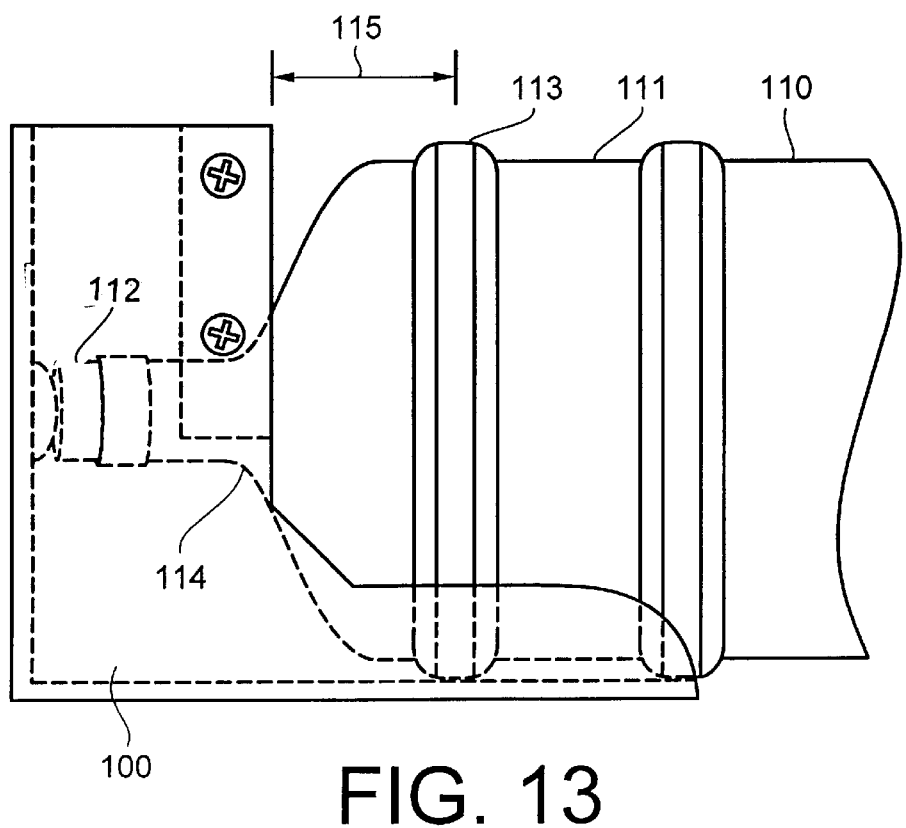
FIG. 13

OBJECT ENGAGING TOOL AND METHOD OF MANIPULATING OBJECT USING SAME

This application claim benefit to Provisional Application No. 60/195,293 filed Apr. 7, 2000.

BACKGROUND OF THE INVENTION

1. Field of the Invention

The present application is directed to the field of robotics and more particularly, to the manipulation of bulky and irregular objects such as bottles through the use of robotic manipulation.

2. Description of Related Art

There is a need in bottle handling industries to load bottles, such as full 5 gallon or 3 gallon water bottles into racks or crates. In the past such bottles were loaded manually. Recently, rack loaders using chains having inserts or flights in an elevator configuration have also been used. In such a configuration, bottles are pushed out of the elevator into the rack using, for example, air cylinders. While handling bottles in such a manner has limited efficiency, moving bottles using an elevator lacks the requisite flexibility and cannot be used for unloading.

Most bottles, such as, for example, commercial water bottles are irregularly shaped and difficult to grasp. While it is preferred to grasp the bottle by its neck only during normal upright handling, the weight of most bottles makes neck grasping tenuous during loading and unloading operations since bottles must necessarily be tilted. Any changes in orientation of the bottle from its vertical axis give rise to disproportionate torque forces generated from the body of the bottle on the neck. Such forces are difficult to manage even in a robotic context. Some are developing very complex mechanical gripping tools costing thousands of dollars. However, the problem of managing weight transfers associated with tilting bottles for loading and unloading must still be dealt with. Problems multiply when it is desired to handle several bottles simultaneously, yet such handling is necessary if loading and unloading operations are to be cost efficient.

Consequently there is a need in the art for a device and method for loading and unloading bottles, which device could be used in conjunction with commercial industrial robots, lifting arms, mechanical lifts, or the like.

SUMMARY OF THE INVENTION

A method and apparatus are provided for manipulating a generally bottle shaped object, having a body and a neck, preferably with a mechanical arm. Thus an object engaging tool, controllably coupled to the mechanical arm using for example a coupling device may be positioned over the object while the object is resting in an upright position. A first contact surface of the object engaging tool engages the neck of the object on a first side thereof and a second contact surface engages the body of the object on a second side thereof opposite the first side. The second contact surface is preferably offset from the first contact surface such that the body of the object is engaged by the second contact surface at a point farther along a longitudinal axis associated with the object than the neck and on the opposite side thereof so as to establish a cantilever. The shape of the first contact surface further may generally conform to the cross section of a typical neck of the object, and the shape of the second contact surface may generally conform to the cross section of the body of a typical object.

Once positioned over the object, the position of the object engaging tool may be changed in a generally downward tilting manner so that the weight of the object is transferred to the engaging tool and may be supported between the first contact surface and the second contact surface in cantilevered relation. Accordingly, the object neck is cammed against the upper contact surface to securely support the object to facilitate movement thereof with the mechanical arm. The object may then be moved to a desired position by applying a lifting and translating motion to the mechanical arm.

BRIEF DESCRIPTION OF THE DRAWINGS

The present invention will become more fully understood from the detailed description given herein below and the accompanying drawings, which are given by way of illustration only, and thus are not limitative of the present invention, and wherein:

FIG. 12 is a diagram illustrating a three-quarter view of an engaging tool in accordance with various exemplary embodiments of the present invention;

FIG. 13 is a diagram illustrating a view of an engaging tool in relation to an object in accordance with various exemplary embodiments of the present invention;

DETAILED DESCRIPTION OF THE DRAWINGS

Thus a method and apparatus are provided for manipulating bottles having a neck substantially smaller than its body. In accordance with various exemplary embodiments of the present invention, the weight of the bottle or like object may be cantilevered, allowing the weight of the body to engage the object onto the tool preferably at or near the neck of the bottle. Essentially, a neck portion of the bottle is constrained on one side and a body rib portion is supported on the opposite side at a point sufficiently farther along a longitudinal axis associated with the bottle, creating a constrained position that engages the bottle into the tool. It will be appreciated by those skilled in the art that the distance between the point on the tool which engages the neck of the bottle and the point on the tool which engages the body of the bottle defines a moment arm which should be sufficiently long to support the expected weight of the bottle. The robot arm, lifting arm, or the like, by way of a coupler or coupling device, does the work of positioning the tool onto the bottle, levering the "bound" position. It should be noted that although the tool of the present invention may support, grasp and manipulate bottles, it may further be used on any elongated object, for example gas cylinders such as propane, oxygen, or the like. Although intended for cylindrical objects having a neck smaller than the body, other shaped objects may be manipulated in this fashion.

As can be seen in FIGS. 1–4, The present application is directed to an attachment to facilitate the aim of grasping and supporting such a bottle or other object having a shape allowing the cantilevering of the weight of the object from a pair of offset jaws grasping one end thereof. The tool or fixture taught in the present application may be attached to a robot or mechanical arm to pick up the bottle. In this fashion, the robot performs as much work as possible. The tool or fixture disclosed herein has the additional advantage of being relatively simple to manufacture and of substantial reliability, there being no moving parts outside of the commercially available industrial robot. This is important considering the amount of investment required for the robot.

Figure 1:
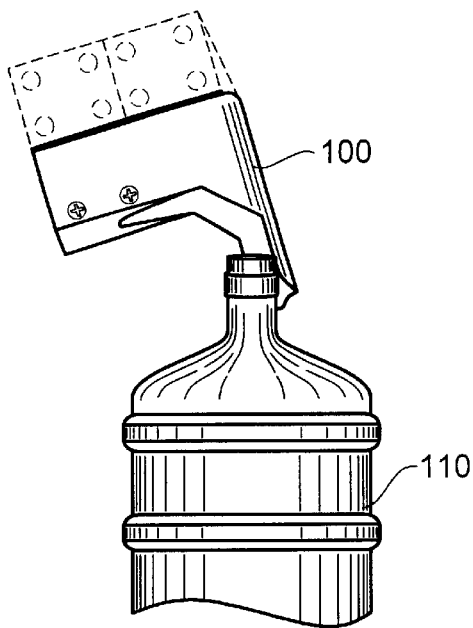
FIG. 1 is a diagram illustrating positioning an engaging tool in accordance with various exemplary embodiments of the present invention.
Figure 2:
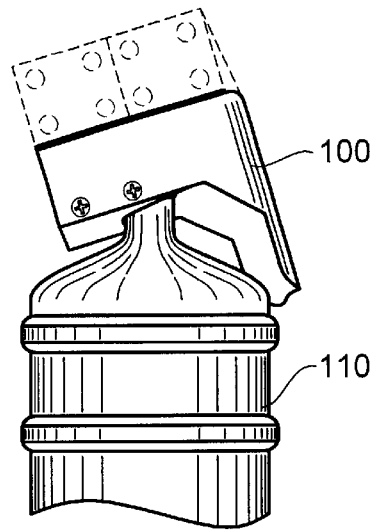
FIG. 2 is a diagram illustrating an engaging tool engaging an object in accordance with various exemplary embodiments of the present invention.
Figure 3:
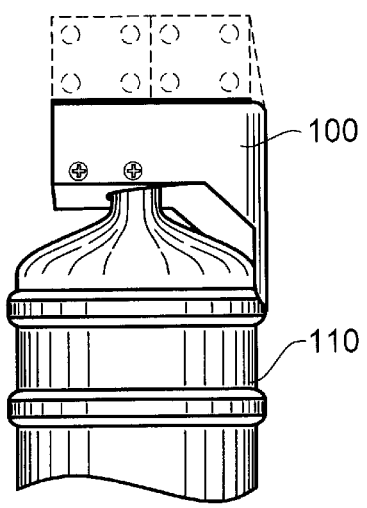
FIG. 3 is a diagram illustrating an engaging tool further engaging an object in accordance with various exemplary embodiments of the present invention.
Figure 4:
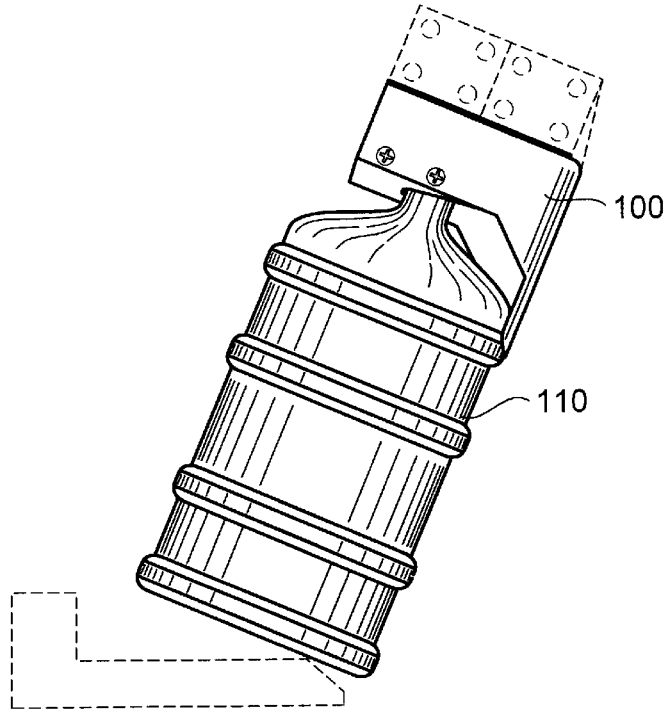
FIG. 4 is a diagram illustrating an engaging tool changing position in accordance with various exemplary embodiments of the present invention.

Thus in accordance with various exemplary embodiments of the present invention, FIG. 1 illustrates object engaging tool 100 being positioned to engage objects 110 which, as illustrated are 5 gallon water bottles. As will be appreciated, object engaging tool 100 is moved into position over object 110 as is shown in FIG. 2, such that a neck portion may be engaged and then a body portion engaged as is further shown in FIG. 3. Once object 110 is engaged, then a generally downward and sideward force may be applied to object engaging tool 100 through the use of, for example, a mechanical arm to be described in greater detail hereinafter, as in shown in FIG. 4.

Figure 5:
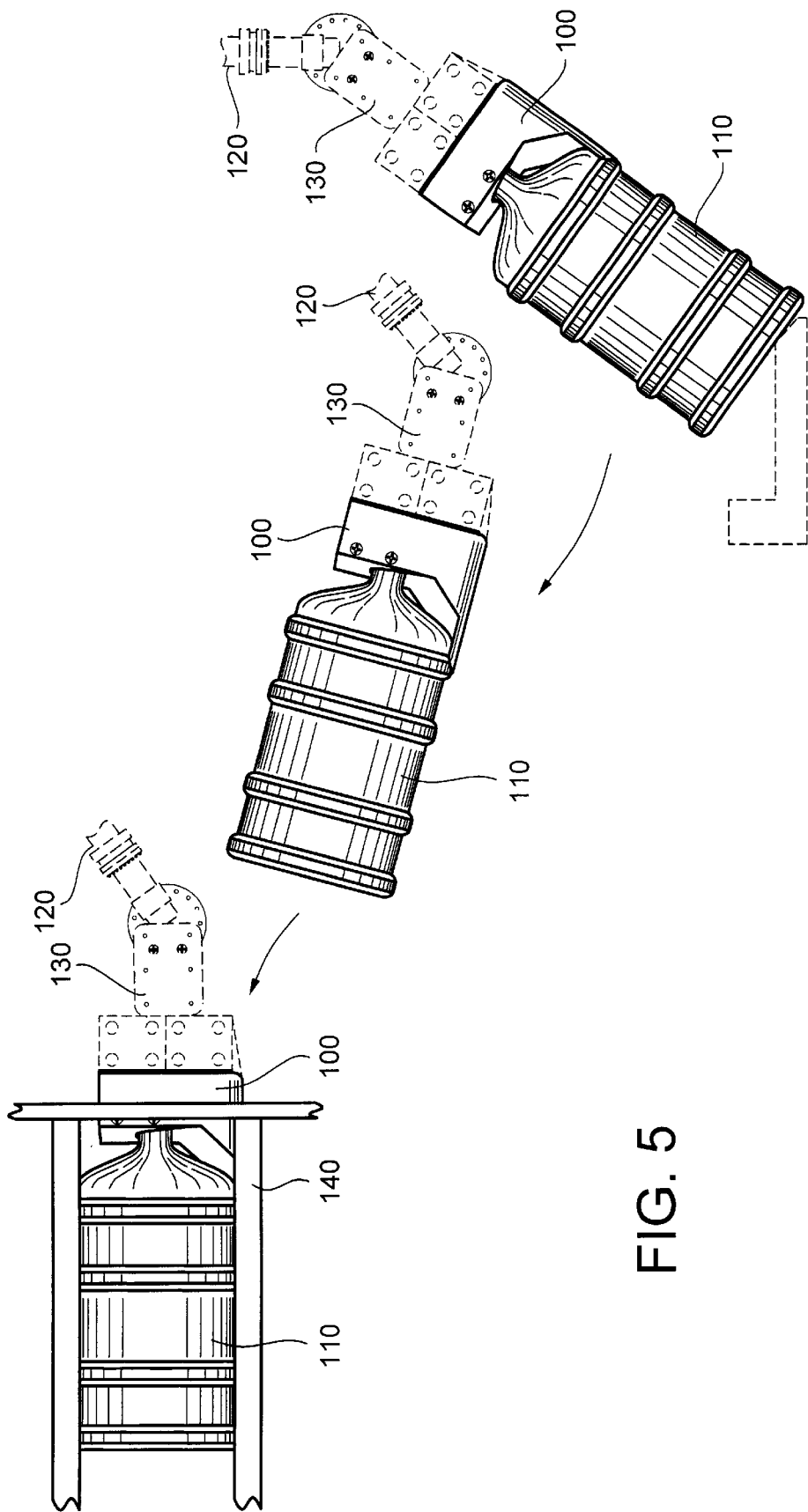
FIG. 5 is a diagram further illustrating an engaging tool changing position in accordance with various exemplary embodiments of the present invention.

Once objects 110 are sufficiently tilted the weight of objects 110 may be transferred to object engaging tool 100 such that the weight of objects 110 are fully supported in cantilevered relation by the manipulation of, for example, coupling member 130 as illustrated in FIG. 5 which may further be attached to mechanical arm 120 as also illustrated. Objects 110 may be transferred in this fashion laterally across a work space to a resting position such as resting surface 140 which is preferably a storage rack or the like. It will also be appreciated that object engaging tool 100 may be used to transfer object 110 to other resting positions such as on a truck or pallet or the like.

Figure 6:
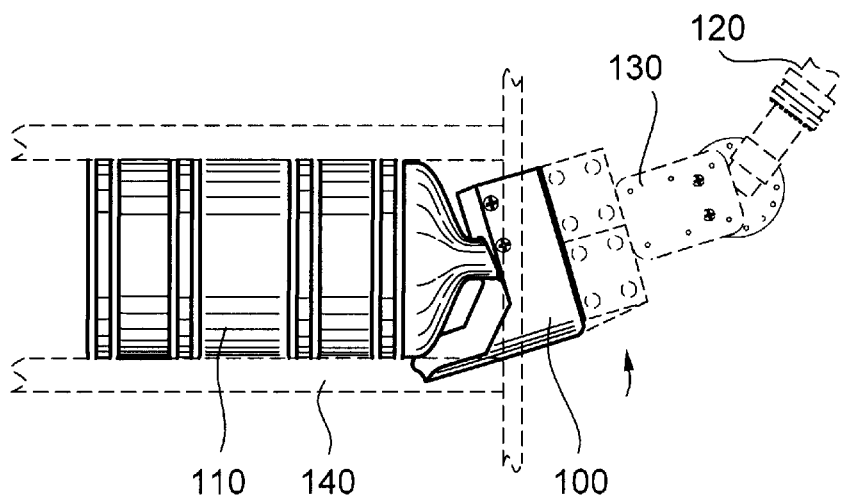
FIG. 6 is a diagram further illustrating an engaging tool disengaging in accordance with various exemplary embodiments of the present invention.
Figure 7:
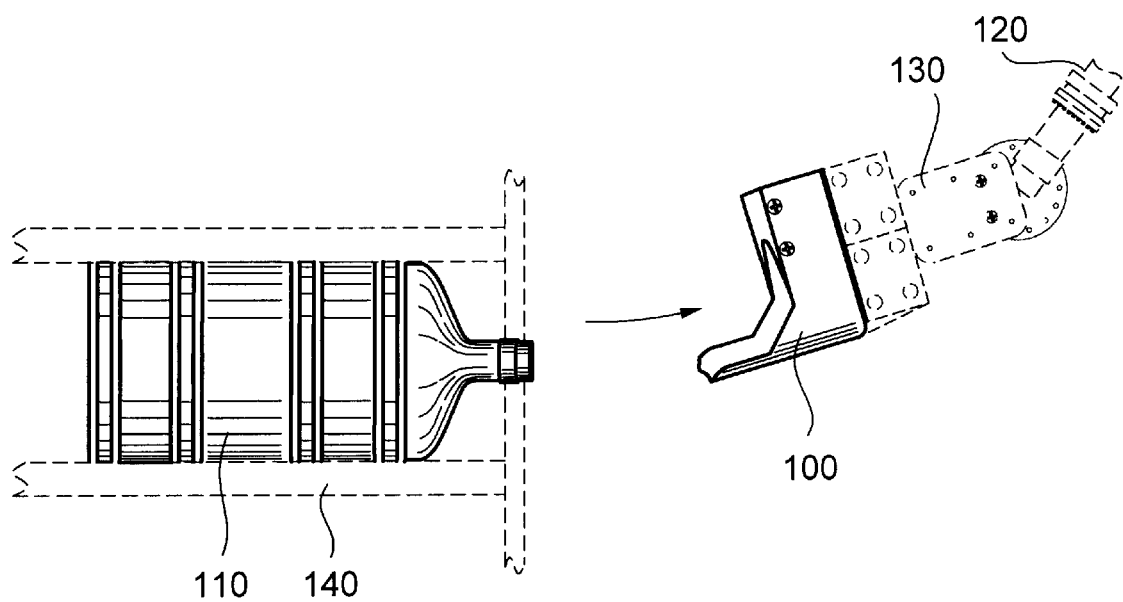
FIG. 7 is a diagram further illustrating an engaging tool disengaging in accordance with various exemplary embodiments of the present invention.
Figure 8:
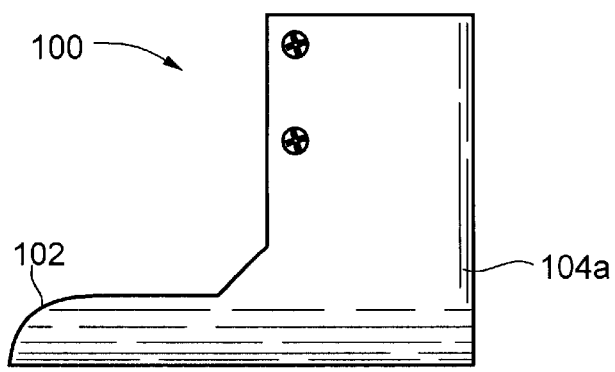
FIG. 8 is a diagram illustrating a side view of an engaging tool in accordance with various exemplary embodiments of the present invention.
Figure 9:
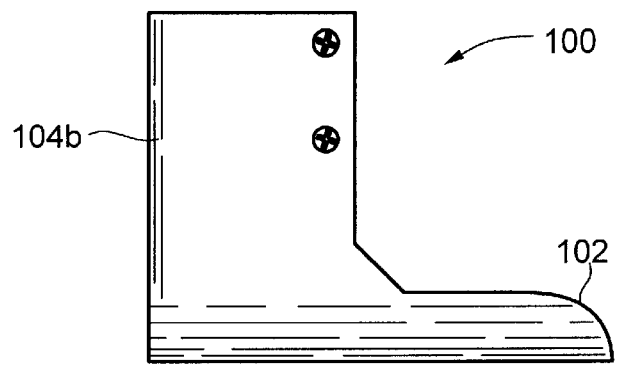
FIG. 9 is a diagram illustrating a side view of an engaging tool in accordance with various exemplary embodiments of the present invention.
Figure 10:
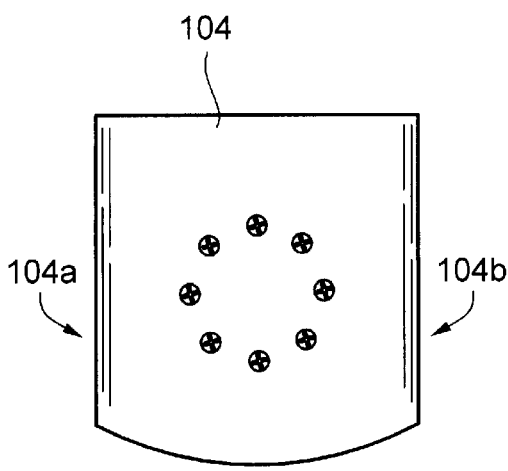
FIG. 10 is a diagram illustrating a rear view of an engaging tool in accordance with various exemplary embodiments of the present invention.
Figure 11:
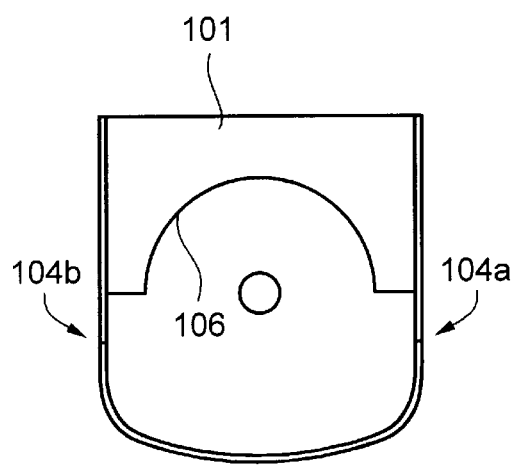
FIG. 11 is a diagram illustrating a front view of an engaging tool in accordance with various exemplary embodiments of the present invention.

Once objects 110 are placed within proximity to resting surface 140, they may be further positioned as is illustrated in FIG. 6 wherein object engaging tool 100, through coupling member 120, may begin to transfer the weight of objects 110 to resting surface 140. Once the weight of object 110 is fully supported by resting surface 140 object engaging tool 100 may be maneuvered such that it becomes disengaged from the body and neck portions of objects 110 as will be described in greater detail hereinafter and is shown in FIG. 7. Once fully disengaged, object engaging tool 100 may be repositioned to further engage addition objects 110 for movement and placement.

It will be appreciated that the action of object engaging tool 100 is carried out using a fairly simple design as is illustrated in FIGS. 8–12. Therein it can be seen that object engaging tool 100 generally comprises a neck engaging portion 101, a body engaging portion 102, a mounting portion 104, supporting surface 105, and neck engaging surface 106. It should be noted that body engaging surface 105 and neck engaging surface 106 are curved to fit the widest object body and neck dimensions anticipated. It can be further seen, for example, in FIG. 14 that mounting surface 104 may include side portion 104a and 104b which may be formed from, for example, a single piece of stamped metal and bent inwardly or otherwise formed to establish a maximum engaging distance between the top of an engaged object and the engaging portion of the neck. Side portions 104a and 104b may also provide a mounting bracket for neck engaging portion 106.

The manner of engaging object 110 with object engaging tool 100 may be better appreciated by considering FIG. 13. Therein it can be seen that object 110 may include a body portion 110, a neck portion 112, and may further include a rib portion 113 and a neck engaging portion 114. It is important to note that distance 115 between rib portion 113 and neck engaging portion 114 forms a moment arm of the effective cantilever associated with object engaging tool 100. Thus, materials associated with the production of object engaging tool 100 including fasteners, neck portions and the like should be sufficiently strong to fully bear the anticipated weight of object 110 fully on the moment arm represented by distance 115. It should further be noted that, for example, neck engaging portion 114 of object 110 is smaller than neck engaging surface 106 of object engaging tool 100 such that object 110 may be comfortably engaged at the neck. The diameter of neck engaging surface 106 limits the maximum possible diameter of neck engaging portion 114 of object 110.

In accordance with various alternative exemplary embodiments the object engaging tool of the present invention may be implemented in a multiple engaging tool fashion not shown. An exemplary multiple object engaging tool may include individual engaging elements mounted on a mounting section. The entire assembly may further be mounted on a coupling member and connected to a mechanical arm to allow automatic positioning of multiple objects 110 in the manner previously described. It should also be noted that while previous several objects may be engaged in this manner, in its simplest form, the present invention may be embodied in a single object engaging tool disposed on a mechanical arm.

Figure 14:
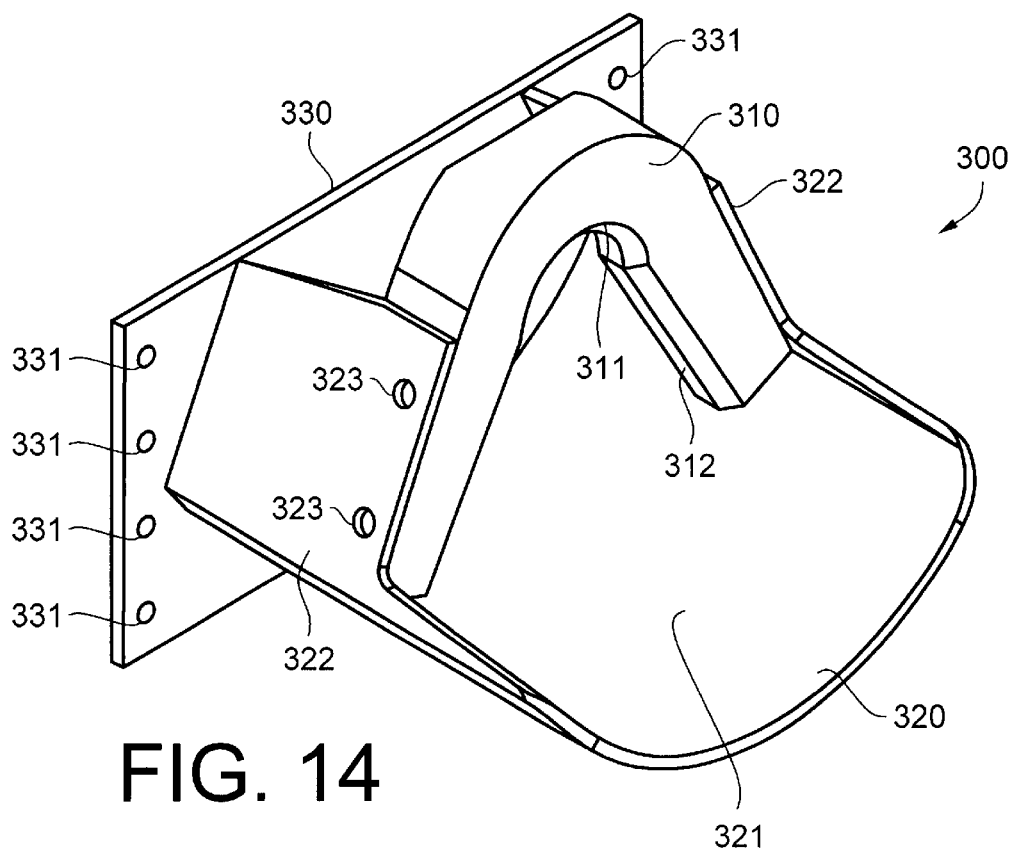
FIG. 14 is a mechanical drawing illustrating an exemplary engaging tool in accordance with various alternative exemplary embodiments of the present invention.
Figure 15:
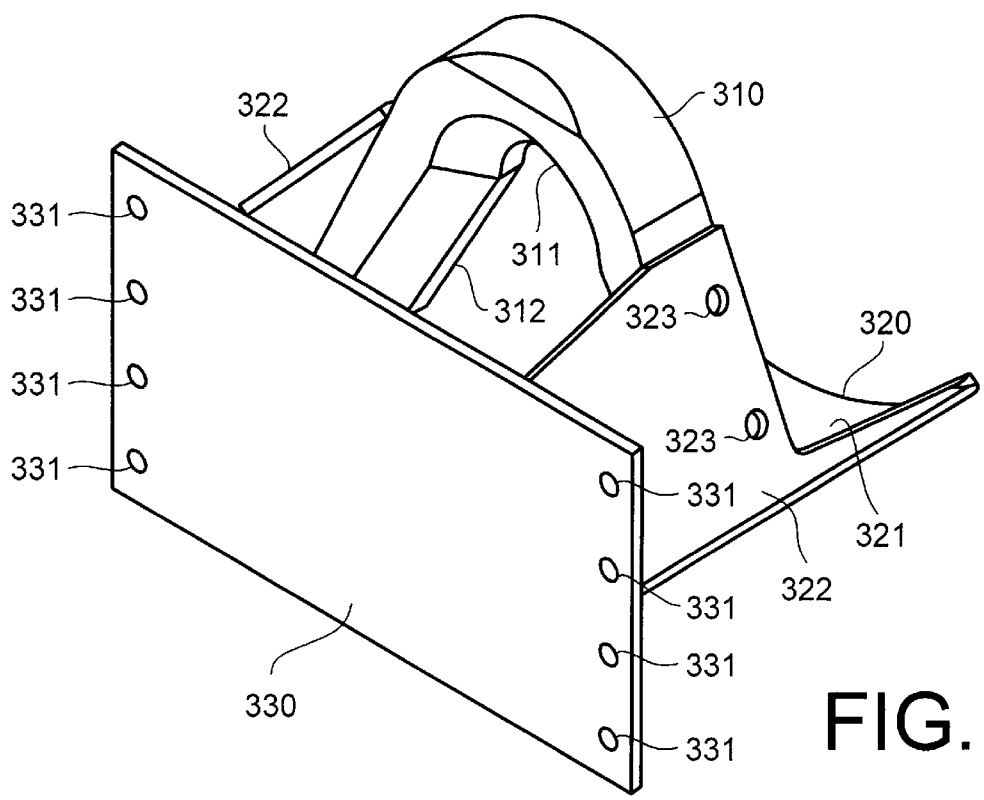
FIG. 15 is a mechanical drawing further illustrating an exemplary engaging tool in accordance with various alternative exemplary embodiments of the present invention.

Further in accordance with alternative exemplary embodiments of the present invention a detailed mechanical diagram of object engaging tool 300 is illustrated in FIGS. 14–15. In a slightly different configuration, object engaging tool 300 includes neck engaging portion 310, body engaging portion 320, and mounting portion 330. Body engaging portion 320 may further include body engaging surface 321, side portions 322, and mounting holes 323. Neck portion 310 may further include neck engaging surface 311 and guide surface 312. Mounting portion 330 may further include mounting holes 331. As will be appreciated by one skilled in the art, object engaging tool 300 is easily assembled from as little as three raw pieces, e.g. neck engaging portion 310, body engaging portion 320, and mounting portion 330.

The invention being thus described, it will be obvious that the same may be carried in many ways. Such variations are not to be regarded as a departure from the sprit and scope of the invention, and all such modifications are intended to be included within the scope of the following claims.

What is claimed:

1. A method of manipulating an object with a mechanical arm, the object having a body and a neck comprising the steps of:

a) positioning an object engaging tool controllably coupled to the mechanical arm over the object resting in an upright position, such that a first contact surface of the tool engages the neck of the object on a first side thereof and a second contact surface of the tool engages the body of the object on a second side thereof opposite the first side and offset from the first contact surface such that the second contact surface engages the body of the object at a point farther along a longitudinal axis associated with the object than the neck and on the opposite side thereof, the first contact surface generally conforming to the cross section of the neck of the object, and the second contact surface generally conforming to the cross section of the body of the object; and b) changing the position of the object engaging tool in a generally downward tilting manner so that the weight of the object is transferred to the object engaging tool, which weight is supported between the first contact surface and the second contact surface in a cantilevered relation, wherein the object neck is cammed against the first contact surface to securely support the object to facilitate movement thereof with the mechanical arm.

2. The method of claim 1, further comprising the step of:

moving the object to a desired position by applying a lifting and translating motion to the mechanical arm.

3. The method of claim 2, wherein the object body and neck are both generally cylindrical.

4. The method of claim 2, further comprising the steps of:

positioning the object in a desired location in proximity to a supporting surface;

changing the position of the object engaging tool so that the weight of the object is transferred to the supporting surface; and disengaging the object engaging tool from the cantilevered relation with the object.

5. The method of claim 1, wherein the object is one of: a cylinder, a cask, a keg, and an elongated object having a neck and a body.

6. A method of manipulating an object with a mechanical arm, the object having a body and a neck comprising the steps of:

a) positioning an object engaging tool controllably coupled to the mechanical arm over the object resting in a horizontal position on a supporting surface, such that a first contact surface of the tool engages the neck of the object on an upper side and a second contact surface of the tool engages the body of the object on a lower side opposite the upper side and offset from the first contact surface such that the second contact surface engages the body of the object at a point farther along a longitudinal axis of the object than the neck and on the opposite side thereof, the first contact surface generally conforming to the cross section of the neck of the object, and the second contact surface generally conforming to the cross section of the body of the object; and b) applying a generally upward lifting motion to the object engaging tool so that the weight of the object is transferred from the supporting surface to the object engaging tool, such that the weight of the object is supported between the first contact surface and the second contact surface in cantilevered relation, camming the object neck against the first contact surface to securely support the object to facilitate movement thereof.

7. The method of claim 6, further comprising the steps of:

c) moving the object to a desired position by applying a translating motion to the mechanical arm.

8. The method of claim 6, wherein the object body and neck are both generally cylindrical.

9. The method of claim 6, further comprising the steps of:

d) positioning the object in a desired location in proximity to a supporting surface;

e) changing the position of the object engaging tool so that the weight of the object is transferred to the supporting surface; and f) disengaging the object engaging tool from the cantilevered relation with the object.

* * * * *